(12) United States Patent
Hinds et al.

(10) Patent No.: US 6,701,427 B1
(45) Date of Patent: Mar. 2, 2004

(54) DATA PROCESSING APPARATUS AND METHOD FOR PROCESSING FLOATING POINT INSTRUCTIONS

(75) Inventors: Christopher Neal Hinds, Austin, TX (US); Arun Kumar Varadarajan Rajagopal, Madras (IN)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 09/468,837

(22) Filed: Dec. 22, 1999

(51) Int. Cl.⁷ .............................................. G06F 15/00
(52) U.S. Cl. ..................... 712/244; 712/222; 712/218; 708/506
(58) Field of Search ................................. 712/222, 218, 712/244, 216; 708/203, 204, 205, 495, 506, 632, 525, 530, 531, 532, 533, 534, 553

(56) References Cited

U.S. PATENT DOCUMENTS

| | | | | |
|---|---|---|---|---|
| 4,845,659 A | * | 7/1989 | Hrusecky | 712/222 |
| 5,838,601 A | * | 11/1998 | Yamashita et al. | 708/505 |
| 6,374,345 B1 | * | 4/2002 | Juffa et al. | 712/220 |
| 6,408,379 B1 | * | 6/2002 | Juffa et al. | 708/498 |

* cited by examiner

Primary Examiner—Richard L. Ellis
Assistant Examiner—Tonia L. Meonske
(74) Attorney, Agent, or Firm—Nixon & Vanderhye P.C.

(57) ABSTRACT

A data processing apparatus for processing floating point instructions is responsive to a floating point instruction to apply a floating point operation to a number of operands to produce a final result, result data being generated during a predetermined pipelined stage with further processing then being performed on the result data in one or more subsequent pipelined stages to generate the final result. Exception determination logic determines whether an exception may occur during application of the floating point operation to the operands, and to prevent the execution unit applying the floating point operation to those operands if it is determined that an exception may occur. The exception determination logic is arranged to use at least some of the predetermined control data to compensate for differences between the forwarded result data and the final result relevant when determining whether an exception may occur when processing the second floating point instruction.

17 Claims, 5 Drawing Sheets

| Int Prec | Dbl Prec | Sgl Prec | Value | Condition (non-FZ Mode) SP | Condition (non-FZ Mode) DP |
|---|---|---|---|---|---|
| 7FF | | | Max Int Prec | | Bounce |
| 7FE | | | Max Norm | | Bounce |
| 3FF | 7FF | | DBL NaN, Inf | | Bounce |
| 3FE | 7FE | | DBL Ovfl Det | | Bounce |
| 3FD | 7FD | | DBL Ovfl Det | | Bounce |
| 3FC | 7FC | | DBL Normal | | Normal |
| 07F | 47F | FF | SGL NaN, Inf | Bounce | Normal |
| 07E | 47E | FE | SGL Ovfl Det | Bounce | Normal |
| 07D | 47D | FD | SGL Ovfl Det | Bounce | Normal |
| 07C | 47C | FC | SGL Normal | Normal | Normal |
| FFF | 3FF | 7F | e=0 bias val | Normal | Normal |
| FA0 | 3A0 | 20 | SGL Normal(USA) | MIN(USA) | Normal |
| F9F | 39F | 1F | SGL Unfl(USA) | Normal(LSA) / Bounce(USA) | Normal |
| F81 | 381 | 01 | SGL Norm(LSA) | MIN(LSA) | Normal |
| F80 | 380 | 00 | SGL Denormal | Bounce | Normal |
| C40 | 040 | | DBL Unfl(USA) | Bounce | Normal |
| C3F | 03F | | DBL Unfl(USA) | | Normal(LSA) / Bounce(USA) |
| C01 | 001 | | DBL Norm(LSA) | | MIN(LSA) / Bounce(USA) |
| C00 | 000 | | DBL Denormal | | Bounce |
| 000 | | | Min Int Prec | | Bounce |

FIG. 5

DATA PROCESSING APPARATUS AND METHOD FOR PROCESSING FLOATING POINT INSTRUCTIONS

BACKGROUND OF THE INVENTION

1. Field of the Invention

The present invention relates to a data processing apparatus and method for processing floating point instructions.

2. Description of the Prior Art

It is common for data processing apparatus to be required to perform various floating-point computations on data. It has been found that general purpose processors are not well suited to the performance of floating-point computations, and hence this has led to the development of specialised floating-point units (FPUs) to handle such computations.

If the operation to be performed by such an FPU can be broken down into a number of separate steps, it is common to provide a number of pipelined processing stages within the FPU. By such an approach, it is possible for a number of instructions to be executed simultaneously within the FPU. As an instruction is passed into the pipeline, the FPU will typically receive the operand data required for the instruction from a number of data registers, arid on completion of the instruction, will store the data result to a predetermined destination register.

In some situations, an instruction may have one or more operands that are specified by a result of one or more previous instructions already in the pipelined processing stages of the FPU. Such an instruction will be referred to hereafter as a dependent instruction. In such cases, it is clear that that dependent instruction cannot be executed until the result of each instruction upon which it depends is available, and this can impact on the processing speed of the FPU.

To alleviate this impact, it is known to direct (or "forward") the result to the first pipelined stage at the same time as it is written to the destination register. This avoids the need to wait until the result has been written to the destination register and to then read the data from that register again before being able to execute the dependent instruction.

More recently, an approach has been taken in IBM's S/390 computer family where an unrounded result is forwarded back to the first stage of the pipeline along with a signal indicating whether rounding is required. This enables a further time saving, since the result data is forwarded before the final result is actually determined (i.e. before rounding has taken place), and hence less delay is incurred before execution of the dependent instruction can begin.

When executing instructions, it is possible that an exception condition may be detected by the FPU, and in such a situation it is often necessary to invoke an exception handling routine to deal with the exception, in order to ensure that an appropriate data result is placed in the destination register. Often, the presence of an exception will only become apparent when the final result is computed, and so often much of the exception determination logic is located in the final pipelined stages.

However, in such situations, the detection of an exception condition may occur later than required to stop the issue of subsequent instructions into the pipeline. Such instructions must be either completed or restarted. One known approach is to provide a significant area of memory, referred to as a state frame, in which all intermediate states in the pipeline can be stored as and when required. Thus, if an exception condition is detected, and hence the exception handling routine needs to be invoked to recover from the exception, then the state of all stages of the pipeline can be stored in the state frame, such that the pipeline can be restored to its previous state once the exception handling routine has completed the recovery process. Such an approach was employed in the Motorola MC68040 chip. This approach suffers from the drawback that an instruction, when exceptional, blocks completion of all subsequent instructions currently executing in the pipeline. Further, this technique requires significant time to process a store or load of a state frame to or from memory.

An alternative approach employed in prior art processing units involves the use of a history, or reorder, buffer. The reorder buffer typically stores the entire instruction stream of the data processing apparatus, and has logic arranged to send the instructions to the appropriate processing unit(s) of the data processing apparatus, and to subsequently place in the reorder buffer in association with the instruction the data result determined upon execution of that instruction. As each instruction reaches the bottom of the reorder buffer, it is "retired", for example by storing the data result in the appropriate destination register. If, however, an exception condition is associated with the instruction being retired, then the exception handling routine is invoked to recover from the exception. Subsequent to the recovery process, the instruction stream is restarted from the instruction immediately following the retired instruction.

It will be appreciated by those skilled in the art that both of the above known approaches increase complexity, and hardware/memory requirements of the FPU, which hence increases the cost of the FPU.

Accordingly, an alternative approach to handling exceptions involves detecting exceptions pessimistically during an early pipelined stage, i.e. determining whether an exception may (as opposed to will) occur, and referring all such detected exceptions to the exception handling routine. Whilst this will involve detecting more exceptions than actually would occur, and incurring the processing overhead involved in bouncing such exceptions to the exception handling routine, this often in practice does not have a significant impact on processing speed in applications where exceptions will only occur very rarely. Further, the use of such pessimistic determination of exceptions dramatically reduces the amount of state that needs storing prior to handling the exception, since the instruction giving rise to the exception will not proceed to the next stage of the pipeline, and accordingly no further instructions will be issued. This in turn enables reductions in the size and cost of the FPU.

Assuming an FPU is to adopt the above mentioned pessimistic determination of exceptions, it would seem necessary for the exception determination logic to have the correct operands available when determining the presence of the exception. However, this would appear to preclude the potential speed benefits available by adopting the earlier described technique of forwarding an unfinalised result to the beginning of the pipeline to enable a dependent instruction to begin to be executed.

It is an object of the present invention to provide a data processing apparatus and method which enables efficient processing of dependent instructions when employing pessimistic exception determination techniques.

SUMMARY OF THE INVENTION

Viewed from a first aspect, the present invention provides a data processing apparatus for processing floating point instructions, comprising: an execution unit comprising a plurality of pipelined stages, and being responsive to a floating point instruction to apply a floating point operation to a number of operands to produce a final result, result data being generated during a predetermined pipelined stage with further processing then being performed on the result data in one or more subsequent pipelined stages to generate the final result; exception determination logic for determining based on the operands whether an exception may occur during application of the floating point operation to the operands, and to prevent the execution unit applying the floating point operation to those operands if it is determined that an exception may occur; a forwarding path for forwarding the result data generated in the predetermined pipelined stage during processing of a first floating point instruction to a previous pipelined stage for use as an operand of a second floating point instruction; control logic for generating predetermined control data related to the forwarded result data, the exception determination logic being arranged to use at least some of the predetermined control data to compensate for differences between the forwarded result data and the final result relevant when determining whether an exception may occur when processing the second floating point instruction.

In accordance with the present invention, result data generated in a predetermined pipelined stage during processing of a first floating point instruction can be forwarded to a previous pipelined stage for use as an operand of a second floating point instruction. It should be noted that the result data that is forwarded will not necessarily be the same as the final result, since further processing of the result data is then performed in one or more subsequent pipeline stages in order to generate the final result. In accordance with the invention, control logic is provided for generating predetermined control data relating to the forwarded result data, and exception determination logic used to determine whether an exception may occur is arranged to use at least some of the predetermined control data to compensate for differences between the forwarded result data and the final result relevant when determining whether an exception may occur during processing of the second floating point instruction.

By this approach, it is possible to employ pessimistic determination of exceptions within the data processing apparatus, whilst benefiting from the potential speed benefits available by forwarding an unfinalised result to a previous pipelined stage for use as an operand of a dependent instruction.

In preferred embodiments, the exception determination logic is arranged to determine from an initial exponent value for a final result of the second floating point instruction whether an exception may occur (for example with reference to an exception detection table), and to use at least some of the predetermined control data to determine whether the conclusion reached dependent on the initial exponent value needs altering to compensate for relevant differences between the forwarded result data and the final result.

Typically in floating point operations, values are expressed by a mantissa and an exponent, and accordingly the result data will include a mantissa result value. In preferred embodiments, the control logic is arranged to receive an indication of the mantissa result value, and the predetermined control data generated by the control logic includes a mantissa signal indicating whether the mantissa is all ones.

Further, in preferred embodiments, the result data includes an exponent result value, the control logic is arranged to receive an indication of the exponent result value, and said predetermined control data generated by the control logic includes a number of threshold signals indicating whether the exponent result value is at a threshold value.

It will be appreciated that a number of threshold values may be specified. Preferably, a first threshold signal indicates whether the exponent result value is the largest value which is below the threshold for underflow detection. It should be noted that there may actually be a plurality of first threshold signals, one for each for a number of different operations and/or data types, since the largest value which is below the threshold for underflow detection may be dependent on the particular operation. Hence, for example, there may be a first threshold signal pertinent to an unlike-signed addition (USA) operation, and a further first threshold signal pertinent to a precision conversion operation between different data types.

Further, in preferred embodiments, a second threshold signal is provided indicating whether the exponent result value is the largest allowable value. Again, a number of second threshold signals may be provided, since the largest allowable value may be dependent on the operation being performed and/or the data type. For example, a second threshold signal may be provided pertinent to a like-signed addition (LSA) operation, and a further second threshold signal may be provided pertinent to a precision conversion operation between different data types.

In preferred embodiments, the predetermined control data includes a rounding signal indicating whether the result data was incremented during rounding to produce the final result the exception determination logic is arranged to determine from an initial exponent value for a final result of the second floating point instruction whether an exception may occur, and the exception detection logic is arranged to be responsive to the mantissa signal, the first threshold signal and the rounding signal, such that if the initial exponent value for the final result of the second floating point instruction is based on the forwarded result data, the exception determination logic is arranged not to generate an underflow exception if the first threshold signal indicates that the exponent result value is the largest value which is below the threshold for underflow detection, the mantissa signal indicates that the mantissa result value is all ones, and the rounding signal indicates that the result data was rounded to produce the final result. Hence, by this approach, it can be seen that the exception detection logic can effectively compensate for the difference in the exponent result value forwarded over the forwarding path and the actual exponent of the final result, to ensure that an underflow exception is not generated in situations where the final result would not actually trigger an underflow exception.

Further, in preferred embodiments, the predetermined control data includes a rounding signal indicating whether the result data was incremented during rounding to produce the final result, the exception determination logic is arranged to determine from an initial exponent value for a final result of the second floating point instruction whether an exception may occur, and the exception detection logic is arranged to be responsive to the mantissa signal, the second threshold signal and the rounding signal, such that if the initial exponent value for the final result of the second floating point instruction is based on the forwarded result data, the exception determination logic is arranged to generate an overflow exception if the second threshold signal indicates that the exponent result value is the largest allowable value, the mantissa signal indicates that the mantissa result value is all ones, and the rounding signal indicates that the result data was rounded to produce the final result. Hence, by this approach, it can be seen that the exception determination logic can again compensate for differences between the exponent result value forwarded over the forwarding path, and the actual exponent value of the final result, to ensure that an overflow exception is triggered in situations where an overflow exception would have been triggered if the exception determination logic had received the final result.

In preferred embodiments, the predetermined control data includes a flush signal indicating whether the final result was flushed to a zero value due to the result data being below a predetermined threshold, and if the initial exponent value for the final result of the second floating point instruction is based on the forwarded result data, the exception determination logic is arranged to disregard any underflow exception determined from the initial exponent value for the final result. Again, by this approach, the exception determination logic will compensate for differences between the forwarded result data and the final result in situations where the final result was flushed to zero. In preferred embodiments, flushing to zero will result in the data being flushed to a positive zero.

In addition to the predetermined control data being used by the exception determination logic, in preferred embodiments at least some of the predetermined control data is used to generate signals used within the execution unit when processing the second floating point instruction to alter the forwarded result data to compensate for differences between the forwarded result data and the final result.

For example, the predetermined control data preferably includes a rounding signal indicating whether the result data was incremented during rounding to produce the final result.

In preferred embodiments, the execution unit includes an incrementer to increment an operand input thereto, and a multiplexer associated therewith, the multiplexer being arranged to select the output of the incrementer if that operand is based on the forwarded result data and the rounding signal indicates that incrementing during rounding occurred.

Further, in preferred embodiments, it is possible that the forwarded result data may be used as the multiplier for the second floating point instruction, in which case if the rounding signal indicates that incrementing during rounding occurred, a multiplication unit in the execution unit is arranged to incorporate another instance of the multiplicand in the computation of the multiplication result. Further, it is possible that the forwarded result data may be used as a multiplicand for the second floating point instruction, in which case if the rounding signal indicates that incrementing during rounding occurred, a multiplication unit in the execution unit is arranged to employ a modified recoding table used within the multiplication unit during the computation of a multiplication result.

As another example, the predetermined control data preferably includes a flush signal indicating whether the final result was flushed to a zero value due to the result data being below a predetermined threshold.

In preferred embodiments, the execution unit includes a multiplexer having a zero value as one input and one or more other inputs based on one or more operands, the multiplexer being arranged to select the zero value as its output if the one or more operands are based on the forwarded result data and the flush signal indicates that the final result was flushed to zero.

Viewed from a second aspect, the present invention provides a method of operating a data processing apparatus to process floating point instructions, the data processing apparatus comprising an execution unit having a plurality of pipelined stages, and being responsive to a floating point instruction to apply a floating point operation to a number of operands to produce a final result, result data being generated during a predetermined pipelined stage with further processing then being performed on the result data in one or more subsequent pipelined stages to generate the final result, the method comprising the steps of: (i) determining based on the operands whether an exception may occur during application of the floating point operation to the operands; (ii) preventing the execution unit applying the floating point operation to those operands if it is determined that an exception may occur; (iii) forwarding the result data generated in the predetermined pipelined stage during processing of a first floating point instruction to a previous pipelined stage for use as an operand of a second floating point instruction; (iv) generating predetermined control data related to the forwarded result data, at least some of the predetermined control data being used in said step (i) to compensate for differences between the forwarded result data and the final result relevant when determining whether an exception may occur when processing the second floating point instruction.

BRIEF DESCRIPTION OF THE DRAWINGS

The present invention will be described, further by way of example only, with reference to a preferred embodiment thereof as illustrated in the accompanying drawings, in which.

DESCRIPTION OF A PREFERRED EMBODIMENT

Figure 1:
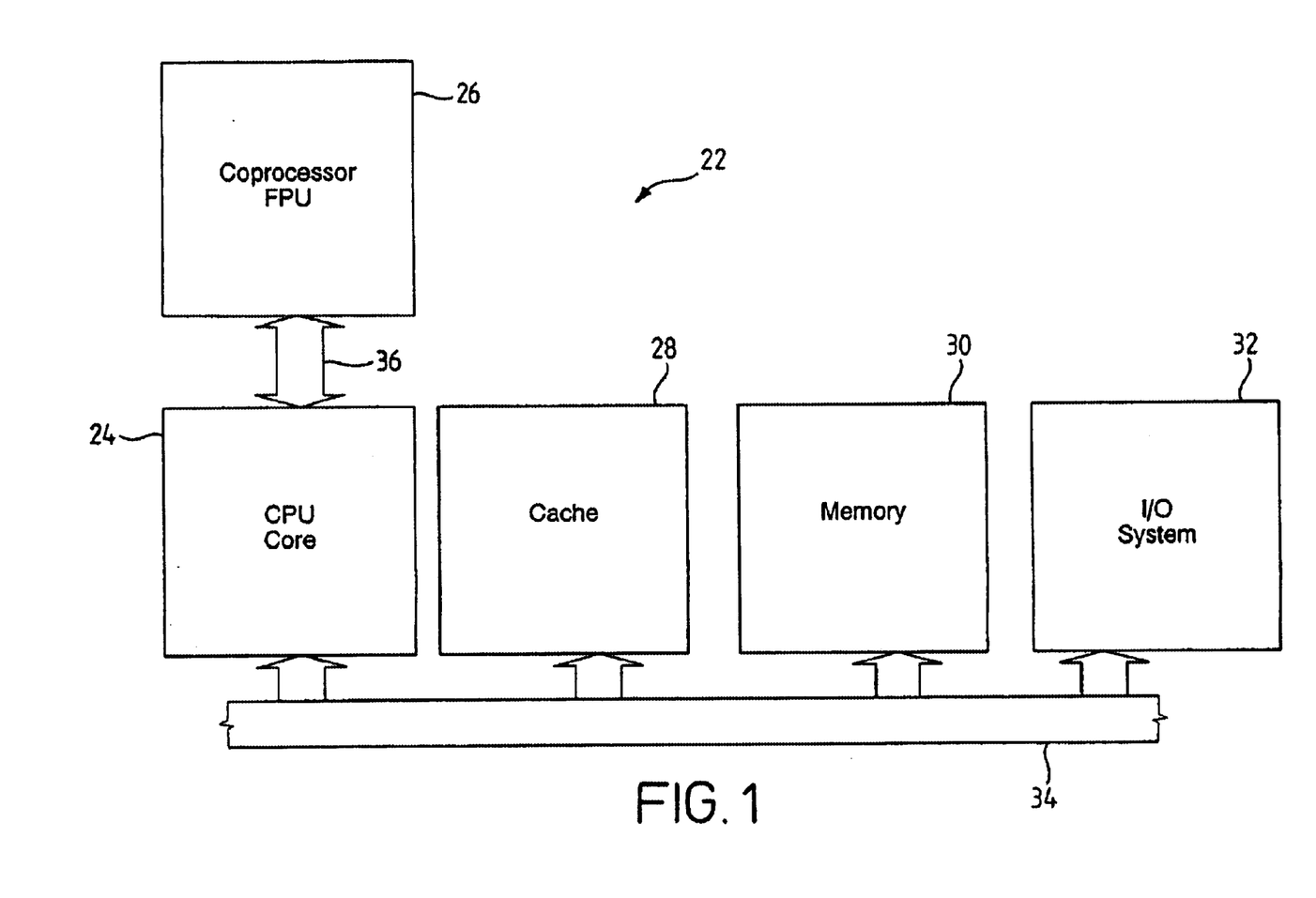
FIG. 1 is a block diagram illustrating elements of a data processing system incorporating a data processing apparatus in accordance with preferred embodiments of the present invention.

FIG. 1 illustrates a data processing system 22 comprising a main processor 24, a floating-point unit (FPU) coprocessor 26, a cache memory 28, a main memory and an input/output system 32. The main processor 24, the cache memory 28, the main memory 30 and the input/output system 32 are linked via a main bus 34. A coprocessor bus 36 links the main processor 24 to the floating-point unit coprocessor 26.

In operation, the main processor 24 executes a stream of data processing instructions that control data processing operations of a general type including interactions with the cache memory 28, the main memory 30 and the input/output system 32. Embedded within the stream of data processing instructions are coprocessor instructions. The main processor 24 recognizes these coprocessor instructions as being of a type that should be executed by an attached coprocessor. Accordingly, the main processor 24 issues these coprocessor instructions on the coprocessor bus 36 from where they are received by any attached coprocessors. In this case, the FPU coprocessor 26 will accept and execute any received coprocessor instructions that it detects are intended for it. This detection is via a coprocessor number field within the coprocessor instruction.

Figure 2:
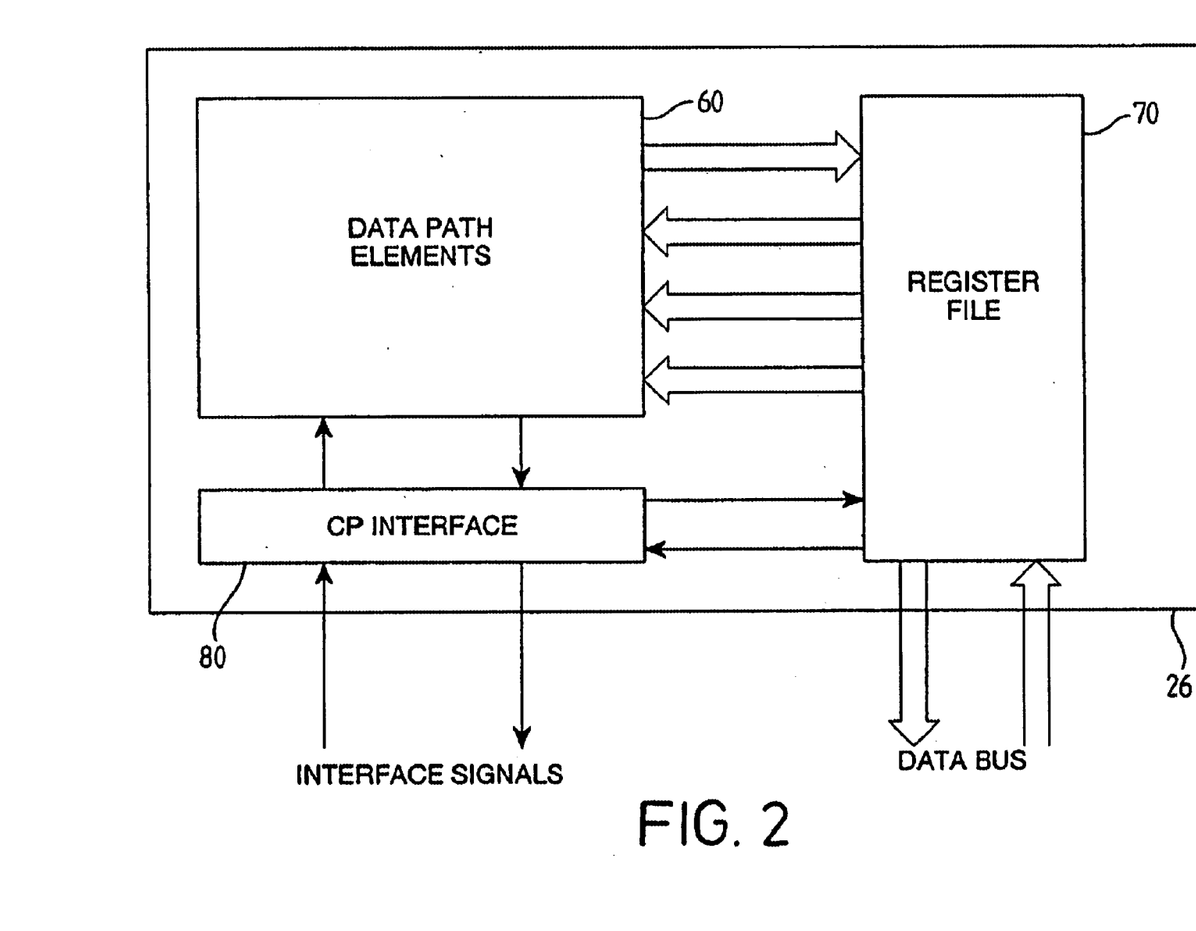
FIG. 2 is a block diagram illustrating elements of the FPU coprocessor in accordance with preferred embodiments of the present invention.

FIG. 2 is a block diagram illustrating in more detail the FPU coprocessor 26 of FIG. 1. As illustrated in FIG. 2, the FPU 26 has a data path elements block 60 for performing the floating-point operation, a coprocessor interface 80 for interfacing with the main processor 24 via the coprocessor bus 36, and a register file 70 for storing, amongst other things, input values for floating-point operations and results of the floating-point operations.

When a floating-point instruction is passed by the main processor to the FPU 26, it is received by the coprocessor interface 80, which determines whether the floating-point instruction can be processed by the FPU 26. Hence, if for any reason, the data path elements block 60 is unable to begin executing a new instruction at the time that new instruction is received, the coprocessor interface 80 will notify the main processor accordingly. However, assuming the instruction can be executed, the coprocessor interface 80 generates control signals for passing to the data path elements block 60 to initiate the floating-point operation.

Prior to execution of the floating-point operation, input values specified by the instruction for the operation will be passed over the data bus to the register file 70. The coprocessor interface 80 then sends control signals to the register file 70 to cause the input values to be stored in the appropriate source registers.

When the floating-point operation is initiated, the contents of the source registers are output from the register file 70 to data path elements block 60. Further, on completion of the floating-point operation, the result is passed from the data path elements block 60 to the register file 70 for storing in the appropriate destination register.

Figure 3:
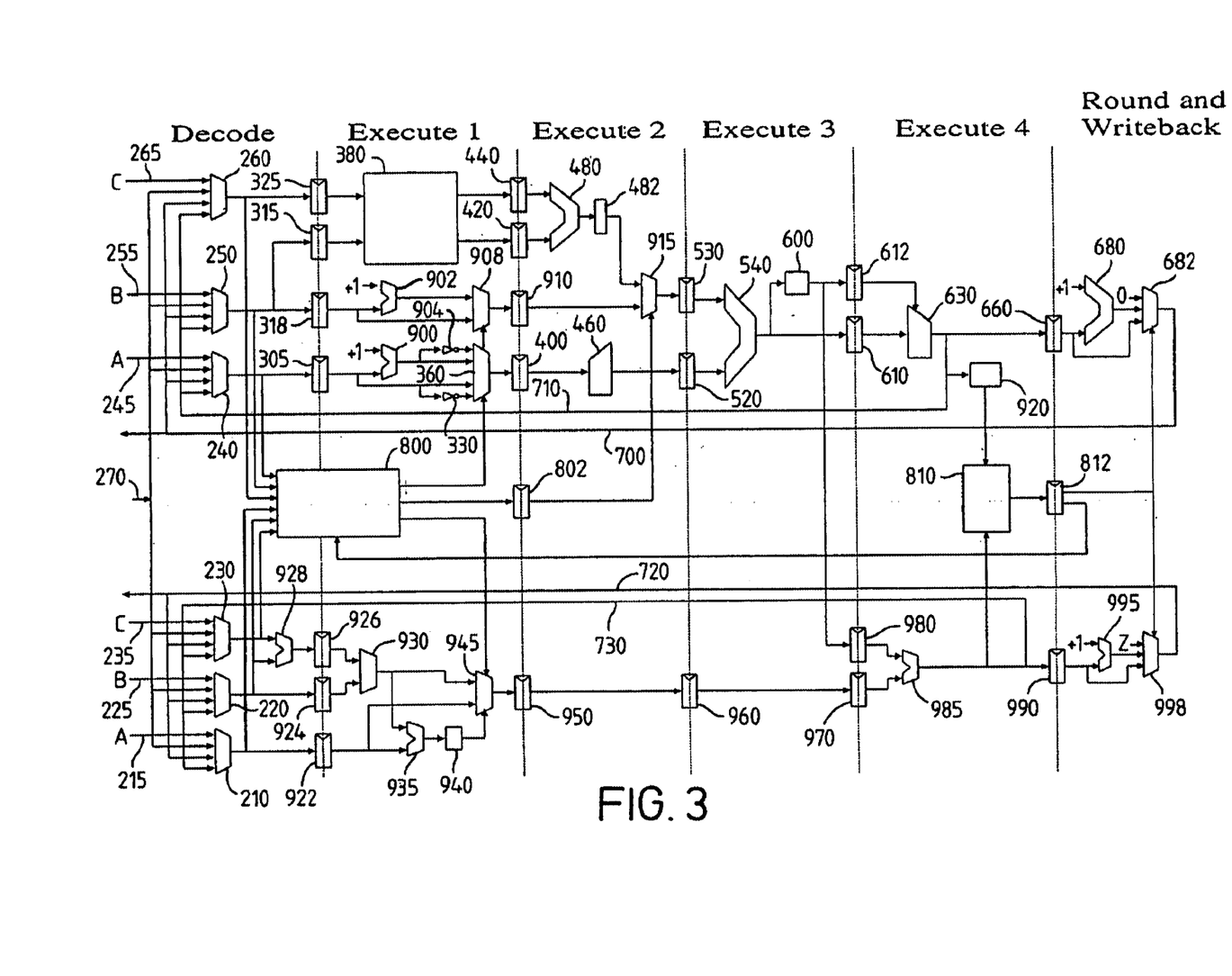
FIG. 3 is a block diagram illustrating in more detail the data processing apparatus in accordance with preferred embodiments of the present invention.

FIG. 3 is a block diagram illustrating in more detail the FPU 26 of preferred embodiments of the present invention, here the FPU being a floating-point multiply accumulate (FMAC) circuit arranged to apply operations to up to three operands A, B and C. Each operand will consist of a mantissa, an exponent, and a sign bit. Input multiplexers 240, 250 and 260 are arranged to select the mantissas for operands A, B and C, respectively, from one of four possible inputs. A first input is mantissa data from the register file 70, as indicated by paths 245, 255 and 265. A second input is mantissa data over path 270 as a result of a load/store forward instruction. With such instructions, the operands are forwarded directly to the data path elements block 60 at the same time as they are written to the register file 70. A third input is over path 700 where the final mantissa result is passed back to the muxes 240, 250, 260 directly at the same time as it is written out to a destination register within the register file 70. A fourth input available in preferred embodiments is over path 710, where unfinalised mantissa result data is passed back to the muxes 240, 250, 260. The muxes 240, 250 and 260 will receive signals indicating which of the four available inputs to select for A, B and C, these signals being derived based on the floating point instruction to be executed and the current state of the FPU pipeline.

Similarly, input multiplexers 210, 220 and 230 are arranged to select the exponents for operands A, B and C, respectively, from one of four possible inputs. A first input is exponent data from the register file 70, as indicated by paths 215, 225 and 235. A second input is exponent data over path 270 as a result of a load/store forward instruction. A third input is over path 720 where the final exponent result is passed back to the muxes 210, 220, 230 directly at the same time as it is written out to a destination register within the register file 70. A fourth input available in preferred embodiments is over path 730, where unfinalised exponent result data is passed back to the muxes 210, 220, 230. As with the mantissa path, these muxes will receive signals indicating which of the four available inputs to select for A, B and C. For the sake of simplicity, the handling of the sign bit information is not shown in FIG. 3, since none of the control data generated by the apparatus of preferred embodiments is derived from the sign bit processing.

Dealing first with the mantissa path, once the muxes have selected the appropriate inputs for A, B and C, the mantissa values output are stored in registers 305, 318, 315 and 325. The mantissa value for B is registered in both registers 318 and 315, since it may be used in addition as an addend, for example for the operation A+B, in which event the path from register 318 is relevant, or may be used as the multiplicand in an operation incorporating the equation B*C, for example the operation A+(B*C), in which event the path from register 315 is relevant. Further, all three mantissa values are passed to the detection logic 800 in the control path, the use of these mantissa values by the detection logic being described later.

In stage Execute 1 (hereafter E1), inverter 330 generates a complemented A input operand. The complemented A input is left in the 1's complement form for the end-around-carry adder 540 in stage E3. Further, the incrementer 900 increments the mantissa value by 1, and the inverter 904 generates a complemented version of that incremented mantissa value. The incrementer 900 is provided to cover situations where an unfinalised result forwarded over path 710 is used as operand A, but where the result was incremented during rounding to generate the final result in the final pipelined stage.

The augend is generated by mux 360 which selects between the A input operand, the complemented A input operand, the incremented A input operand, the complemented incremented A input operand, or a zero value (not shown). The zero value is provided to cover situations where an unfinalised result forwarded over path 710 is used as operand A, but that result was subsequently flushed to zero in the final pipelined stage to produce a positive zero as the final result. The generation of the signals used to drive mux 360 will be discussed in more detail later.

As will be appreciated by those skilled in the art, two distinct cases exist in floating-point addition, the like-signed addition and the unlike-signed addition. In a like-signed addition (LSA) the signs of the input operands are equal for an add operation and opposite for a subtraction. In an unlike-signed addition (USA) the signs are opposite for an addition and equal for a subtraction. A complemented version of the input augend operand is selected in all USA cases, while one of the two uncomplemented augend values are selected in all LSA cases. The output of mux 360 is registered in register 400.

Similarly, with regard to the B mantissa value in register 318, this is passed to a mux 908 in addition to an incremented version generated by incrementer 902. The mux will select the incremented version in situations where the unfinalised result forwarded over path 710 is selected as the B mantissa value, but the result was incremented during rounding to generate the final result in the final pipelined stage, or will select the unincremented version otherwise. However, the mux 908 also receives a zero value (not shown), and as described for mux 360, will select that zero value if an unfinalised result forwarded over path 710 is used as operand B, but that result was subsequently flushed to zero to produce a positive zero as the final result. The value selected by mux 908 is then registered in register 910.

The augend A is then shifted by the Aligner 460 in stage E2 to align the mantissa with either the addend or product, as appropriate, before the summation in the third stage E3, the output from the Aligner 460 being registered in register 520.

The B input operand mantissa and the C input operand mantissa from registers 315 and 325 are multiplied in Stage E1 by the multiplier 380 to produce a sum and a carry output. These are registered in registers 420 and 440, respectively. If the value of the multiplier C is selected from the unfinalised mantissa result data forwarded over path 710, and that data differs from the final result because incrementing was performed during rounding, then the multiplier 380 takes account of this by including another instance of the multiplicand in the computation of the multiplication result.

In preferred embodiments, forwarded data is not used for the multiplicand. However, it is possible to forward unfinalised result data to the multiplicand. What is required in cases of an unfinalised value which required rounding in the final stage of the pipeline and is forwarded to the multiplicand is for each instance of a non-zero bit in the multiplier which results in a copy of the multiplicand added to the product to incorporate an additional bit which is added with the same weight as the multiplicand. In multipliers which implement the commonly used radix 4 recoding scheme to reduce the number of items summed into the product, the same bit must be incorporated into all non-zero, positive partial products, and also in the 1sb bit position for the +2 recoding. For negative, non-zero partial products, the additional bit which would have been incorporated to complete the negation of the multiplicand is inverted, as is the additional 1sb added to the partial product generated for a −2 recoding. Similar modifications are possible for other recoding schemes and for array multipliers as well.

For completeness, set out below are the tables for the commonly used radix 4 recording. In these tables, the x[i+1:i−1] represents the 3-bit sliding window used to encode the multiplicand into the partial product to be summed into the product, mc is the multiplicand, and the additional bit is the bit referred to above. Note that for the unfinalised data the bits considered in the recoding are the unfinalised data, not the result of a rounding operation.

| Finalised data (not requiring any rounding) | | |
|---|---|---|
| x [i + 1:i − 1] | Partial Product | Additional Bit |
| 000 | 0 | 0 |
| 001 | {0, mc} | 0 |
| 010 | {0, mc} | 0 |
| 011 | {mc, 0} | 0 |
| 100 | {~mc, 1} | 1 |
| 101 | {1, ~mc} | 1 |
| 110 | {1, ~mc} | 1 |
| 111 | 0 | 0 |

| Unfinalised data requiring rounding | | |
|---|---|---|
| x [i + 1:i − 1] | Partial Product | Additional Bit |
| 000 | 0 | 0 |
| 001 | {0, mc} | 1 |
| 010 | {0, mc} | 1 |
| 011 | {mc, 1} | 1 |
| 100 | {~mc, 0} | 0 |
| 101 | {1, ~mc} | 0 |
| 110 | {1, ~mc} | 0 |
| 111 | 0 | 0 |

The registered sum and carry data are added in Stage E2 in the adder 480, and the product value obtained is then rounded in rounder 482. The rounded product value is passed to mux 915, along with the addend value from register 910. The mux is arranged to select the product value for a multiply or multiply-accumulate type operation, or the addend for an add/subtract type operation, the selected value being stored in register 530. Further, if the multiplier result is based on an unfinalised mantissa result forwarded over path 710, and that result was ultimately flushed to zero in the final pipelined stage, the mux 915 is arranged to select a zero value here (not shown), since clearly the result of the multiplication should be zero if either the multiplier or multiplicand should actually have been a zero value. A control signal is sent to the mux 915 from the detector logic 800 via the register 802.

In Stage E3, the final addition of the augend and the addend or product is performed by end-around-carry adder 540. The value obtained is passed to register 610, and also passed to a Leading 0 and 1 detector 600 which computes the location of the most significant '1' and most significant '0'. If the result output by the adder 540 is positive, the location of the most significant 1 is used in the generation of a NormShiftCount value used in Stage E4 to normalize the result; if the result is negative, the location of the most significant zero is used in the generation of the NormShiftCount value. The NormShiftCount value is registered in register 612.

In stage E4, the output of register 610 is input to Normalizer 630 with the NormShiftCount value calculated at stage E3. The result is normalized by shifting it to the left the number of places specified by the NormShiftCount value, and is then registered in register 660. This unfinalised result is also forwarded back over path 710 to the muxes 240, 250, 260 to allow selection of that result as an operand for a dependent instruction. Further, the unfinalised result is also passed to logic 920 which produces predetermined data about that mantissa result for forwarding to control logic 810 within the control path. This predetermined data enables the control logic to determine whether a round increment of the result will take place in the round and writeback stage, and whether the mantissa is all-ones. It will be appreciated that as an alternative to providing logic 920, the mantissa may be forwarded directly to the control logic 810.

In the round and writeback stage, the round adder 680 increments the mantissa result, and then the result is passed to multiplexer 682 along with the unincremented mantissa result. This multiplexer also receives a zero value. If the result would produce an underflow situation, and "Flush-to-Zero" mode is selected, then control logic 810 in the control path will generate a drive signal for mux 682 to cause it to select the zero value, i.e. to flush the result to a positive zero value. Assuming such flushing is not required, the drive signal for the mux will cause the mux to select either the incremented or unincremented result, depending upon whether the rounding mode and result precision require the result value to be incremented or not. The output of the mux 682 is then written back as the final result to the register file over path 700.

Considering now the exponent path, the A and B exponent values selected by muxes 210 and 220 are passed straight through to registers 922 and 924 in the decode stage, whilst the B and C exponent values are passed to product exponent adder 928, which adds the exponents to determine the exponent for the product B*C, this value then being registered in register 926. Further, all three exponent values are passed to the detection logic 800 in the control path, the use of these exponent values by the detection logic being described later. It will be appreciated that as an alternative to forwarding the complete exponent values to the detection logic 800, it may be more efficient in certain embodiments to incorporate logic within the exponent path (analogous to the logic 920 illustrated in the mantissa path) to generate predetermined data describing the exponent values.

In stage E1, the B exponent and product exponent are passed to multiplexer 930, which is arranged to select the product exponent for a multiply or multiply-accumulate type operation, or the B exponent for an add/subtract type operation, the selected exponent being passed to exponent difference adder 935 and exponent select multiplexer 945.

The exponent difference adder 935 also receives the A exponent, and generates a signal indicating which of the two input exponents is larger. This signal is passed to exponent select logic 940, which based on that signal generates a select signal which is passed to exponent select mux 945.

The exponent select mux receives the same two exponent values received by the exponent difference adder 935, and registers the larger exponent value in the register 950 as indicated by the select signal received from the exponent difference adder. However, the decision made by the mux can be influenced by the detection logic 800 in situations where the unfinalised result forwarded over paths 710, 730 has been used as the operand for B and/or C, and where a flush to zero subsequently occurred to obtain the final result. In such cases, the detection logic 800 sends a signal to the mux 945 to force the mux to select the operand A exponent. Similarly, if the unfinalised result forwarded over paths 710, 730 has been used as the operand for A, and where a flush to zero subsequently occurred to obtain the final result, the mux 945 is arranged to select the operand B or product exponent. The exponent value selected by the mux is considered to be the initial exponent value for the final result, and is passed unaltered through stages E2 and E3 via registers 960 and 970.

Register 980 receives the NormShiftCount value generated in the mantissa path, and in stage E4, the exponent adjust adder 985 is arranged to adjust the exponent by subtracting the NormShiftCount value. The adjusted exponent value is passed to register 990, and forwarded over path 730 to muxes 210, 220, 230. Further, the adjusted exponent value is passed to the control logic 810 for use in generating predetermined control data to be passed to the detection logic 800. The actual control data generated in preferred embodiments will be discussed in more detail later. Once again, as mentioned earlier with reference to the routing of exponents to the detection logic 800, it will be appreciated that as an alternative to forwarding the complete exponent value to the control logic 810, it may be more efficient in certain embodiments to incorporate logic within the exponent path (analogous to the logic 920 illustrated in the mantissa path) to generate predetermined data describing the exponent value.

In the round and writeback stage, the exponent rounding adjust adder 995 is arranged to increment the exponent, with both the incremented and unincremented exponent being passed to multiplexer 998. This multiplexer also receives a zero result (Z) value. As with the mantissa path, if the result would produce an underflow situation, and "Flush-to-Zero" mode is selected, then control logic 810 in the control path will generate a drive signal for mux 998 to cause it to select the zero result value, i.e. to flush the result to a positive zero value in internal format (a zero in internal format having a non-zero exponent). Assuming such flushing is not required, the drive signal for the mux will cause the mux to select either the incremented or unincremented exponent, the incremented exponent being selected if the rounding of the mantissa caused an overflow of the mantissa. The final exponent value is then written back to the destination register over path 720, and is also provided to the muxes 210, 220, 230.

The basic job of the control path is to generate control signals to control the circuit elements in the pipeline, to monitor the input operands to the pipeline to detect any special operands, for example zero, infinity, denormal, NaN ("not a number"), so as to ensure that such special operands are handled appropriately, and to determine if exceptions may occur given the input operands. Since in preferred embodiments of the present invention, some of the operands may be derived from unfinalised result data forwarded back over paths 710, 730, it is important to ensure that the elements in the control path have access to information that enables them to determine if those operands are incorrect.

The detection logic 800 is one element in the control path involved in the above process, which incorporates within it exception determination logic for determining whether exceptions may possibly occur given the input operands, such determination being based on a review of the exponents of the operands. To provide correct exponents to the detection logic 800, it is necessary to provide sufficient information to determine first whether the forwarded exponent is incorrect and second whether the exponent, if incorrect, will alter the exception detection result generated from evaluation of the forwarded exponent.

The exponent will be incorrect if:
1) the mantissa of the unfinalised result is all ones and a round increment is required to obtain the final result; or
2) the final result is below the minimum threshold for the destination precision and is to be replaced with a zero result value for further computation and output, i.e. the result is to be flushed to zero if Flush-to-Zero mode is enabled.

The control logic 810 generates signals indicating the presence of either of the above two conditions. In particular, having regard to condition 1, the control logic 810 issues a signal called WrFwdMIsAllOnes, which is set (e.g. given a logic one value) if the forwarded mantissa is all ones in the current precision. Further, the control logic 810 issues a signal called WrFwdRndBit, which is set if a round increment needs to be applied to the forwarded mantissa (to reflect a round increment applied to obtain the final result). Having regard to condition 2, the control logic 810 evaluates the adjusted exponent value before compensation for rounding to determine if the exponent is below the normal range for the destination precision, thereby indicating that a flush to zero should take place, and if so sets a signal called WrFwdFlush.

As mentioned above, if the exponent is incorrect, it then needs to be determined whether this will alter the exception detection result generated from evaluation of the forwarded exponent. The result of the evaluation of the forwarded exponent will be in error if:
1) the result is to be flushed to zero. It should then be treated as a positive zero for all further computations and for exception determination;
2) the forwarded exponent is the largest exponent which would be considered below the threshold for underflow detection for the current precision, AND the mantissa is all ones, AND a rounding increment is required. In this case, the rounding operation would produce a mantissa overflow requiring the exponent to be incremented, shifting the result out of the underflow exceptional range into the normal range, and hence no longer indicating an exceptional condition;
3) the forwarded exponent is equal to the maximum allowable exponent for the current precision, AND the mantissa is all ones, AND a rounding increment is required. In this case, the rounding operation would produce a mantissa overflow requiring the exponent to be incremented, shifting the result over the threshold into the overflow exceptional range, and hence indicating an exceptional condition.

With regard to conditions (2) and (3), it should be noted that different thresholds may apply for different operations. For example, the underflow threshold for condition (2) may be set at one level for USA operations and another threshold for double to single precision conversion operations. Further, the overflow threshold for condition (3) may be set at one level for LSA operations and another threshold for double to single precision conversion operations.

The control logic 810 generates signals indicating the presence of any of the above three conditions. In particular, having regard to condition 1, as mentioned earlier the control logic 810 issues a signal called WrFwdFlush, which is set if a flush to zero should take place. Having regard to condition 2, the control logic 810 issues a signal called WrFwdEIsUSAMin, which is set if the forwarded exponent is the largest exponent which would be considered below the threshold for underflow detection for the current precision for a USA operation, and also issues a signal called WrFwdEIsCvtMin, which is set if the forwarded exponent is the largest exponent which would be considered below the threshold for underflow detection for a double to single precision conversion operation. As mentioned earlier the control logic 810 also issues WrFwdRndBit and WrFwd-MIsAllOnes signals to indicate if a rounding increment is required and if the mantissa is all ones, respectively.

Similarly, for condition 3, the control logic 810 issues a signal called WrFwdEIsMax, which is set if the forwarded exponent is the maximum allowable exponent for the current precision for a LSA operation, and also issues a signal called WrFwdEIsCvtMax, which is set if the forwarded exponent is the maximum allowable exponent for a double to single precision conversion operation.

All of the above-mentioned signals generated by the control logic 810 are registered in register 812, and then forwarded to the detection logic 800 for use in enabling the detection logic to correct where necessary the operand data fed into the pipeline, and to ensure correct detection of exceptions. This will be discussed in more detail with reference to FIG. 4.

Figure 4:
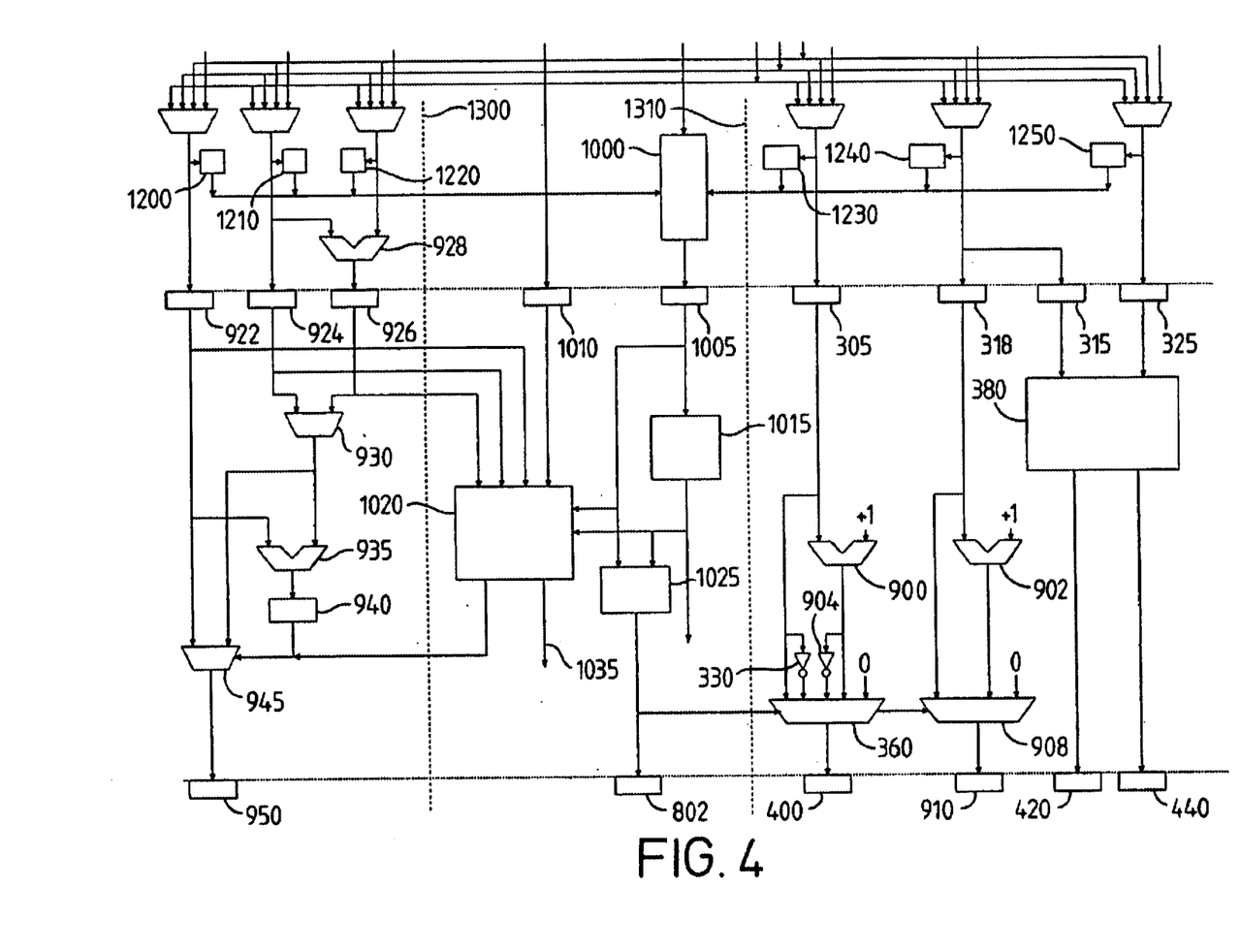
FIG. 4 is a block diagram illustrating in more detail the logic in the control path of the decode and E1 stage of the pipeline.

The part of FIG. 4 to the left of the line 1300 and to the right of the line 1310. illustrates the elements of the exponent and mantissa paths, respectively, in the decode and E1 stages of the pipeline, these elements having been described earlier with reference to FIG. 3. The part of FIG. 4 in the centre between lines 1300 and 1310 illustrates elements of the detection logic 800 that make use of the signals generated by the control logic 810.

In particular the qualifier circuit 1000 is arranged to receive the WrFwdFlush and WrFwdRndBit signals along with signals CwFwdtoA, CwFwdtoB, CwFwdtoC, indicating whether the unfinalised result data forwarded over paths 710, 730 has been selected as the A, B and/or C operands. For each of the three operands, the qualifier circuit produces qualified flush and round signals. The qualified flush signal for a particular operand is set if the unfinalised result data is being used as that operand, and if WrFwdFlush was set, whilst the qualified round signal for a particular operand is set if the unfinalised result data is being used as that operand, and if WrFwdRndBit was set. These six qualified signals created by the qualifier circuit are then stored in the register 1005.

IsZero logic 1015 is then arranged to receive the qualified flush signals, and based on them and signals generated in exponent zero detectors 1200, 1210 and 1220 and mantissa zero detectors 1230, 1240 and 1250 which provide information about the operands, is arranged to determine for each operand whether that operand should be treated as a zero. This will be the case if the operand is zero, or is denormal in Flush-to-Zero mode, if the qualified flush signal for that operand is set, or if a denormal value has been forwarded in Flush-to-Zero mode. An IsZero signal is then output for each operand, which is set if that operand should be treated as zero. Other elements in the control path are then responsive to the IsZero signals to ensure that the zero is handled correctly to produce the correct result specified by the IEEE 754-1985 standard ("IEEE Standard for Binary Floating-Point Arithmetic", ANSI/IEEE Std 754-1985. The Institute of Electrical and Electronic Engineers. Inc., New York. 10017) or the correct result for a Flush to Zero mode condition.

If an IsZero signal is generated for either the B or C operand, then this causes the signal mentioned earlier with reference to FIG. 3 to be sent to the mux 945 to force the mux to select the operand A exponent as the initial exponent value for the result. Similarly, if an IsZero signal is generated for the A operand, the mux 945 is arranged to select the B or product exponent as the initial exponent value for the result.

The Is Zero signals are routed to a mux select logic 1025 along with the qualified round signals from register 1005, and other operation information (e.g. identifying the instruction, precision, mode, etc.). Based on these signals, the mux select logic generates control signals for the muxes 360, 908 and 915 to cause those muxes to choose the appropriate values to output. For example, if the IsZero signal is set for operand A, the control signal to mux 360 will cause it to select zero as the output. Similarly, if the qualified round signal for operand B is set, the control signal will cause the mux 908 to select the incremented value from incrementer 902. As another example, assuming the A operand is non-zero, operation information identifying the operation as a USA operation will be used in combination with the qualified round signal to determine which of the signals from inverters 330 and 904 to select. In another example, if the operation is a multiply or multiply-accumulate operation, and neither B or C are zero, the control signal generated by mux select logic 1025 will cause the 915 to select the signal received from the multiply path, i.e. from rounder 482.

Bounce detection logic 1020 receives via register 1010 the five signals WrFwdEIsMax, WrFwdEIsUSAMin, WrFwdEIsCvtMax, WrFwdEIsCvtMin, and WrFwdMIsAllOnes. It is also arranged to receive the qualified flush and round signals from register 1005, the IsZero signals from the IsZero logic 1015, and the exponents for operands A, B and C. The bounce detection logic is arranged to determine based on the input operands whether an exception may occur during processing of the operation, and to issue an exception signal over path 1035 if such a possible exception is detected. If the IsZero signal indicates that one of the operands should be treated as a zero this will generally disable any exception detected by the bounce detection logic based on that operand.

Figure 5:
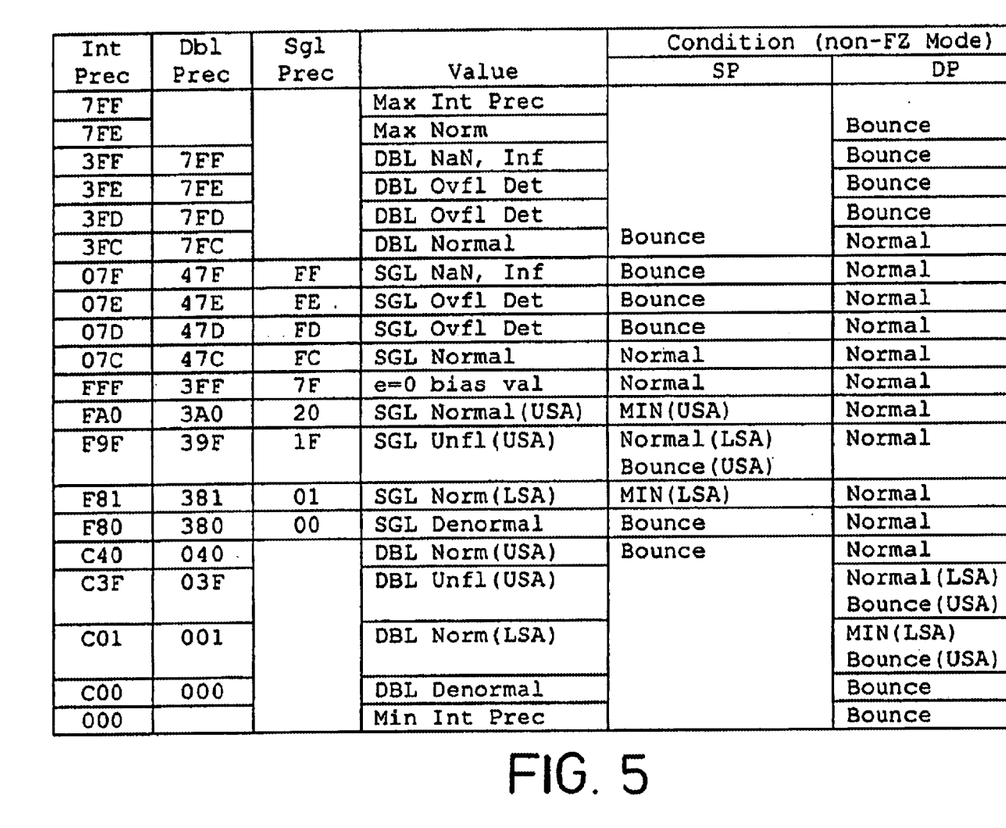
FIG. 5 is a table illustrating a sample exception detection table used by the bounce detection logic.

The bounce detection logic considers the initial exponent value for the result of the operation, this being dependent on the operation, and then in preferred embodiments uses an exception detection table to determine whether an exception may occur (this will be referred to hereafter as the lookup process). For completeness, it should be noted that in a MAC operation the bounce detection logic also uses the product exponent in addition to the initial exponent value for the result. An example of such an exception detection table is shown in FIG. 5. Hence, for example, if the initial exponent is 3FE in internal precision, then this indicates a double precision overflow, and accordingly this indicates that an exception signal should be generated on path 1035.

The five signals received from register 1010 and the qualified flush and round signals received from register 1005 are used to enable the bounce detection logic to determine if an incorrect exponent would alter the result of the exception detection process, and hence alter the signal output on path 1035. As mentioned earlier, the bounce detection logic uses raw operand information based on forwarded data prior to any round and/or flush being done (if any). This results in three scenarios where the initial lookup process of the bounce detection logic gives a wrong indication of an exception:

CASE 1. Incorrect Assertion of Underflow Exception for Non-flushed Result

This case occurs when the forwarded exponent is the largest exponent which would be considered below the threshold for underflow detection or, when used in final exponent generation causes the initial exponent value for the final result to be the largest exponent which would be considered below the threshold for underflow detection. The lookup process of the bounce detection logic will signal underflow for this case. If the mantissa of the forwarded data is all ones and rounding was required of the forwarded result, the lookup process of the bounce detection logic will have incorrectly detected the exceptional condition. If the same instruction were to read data from the register file after writeback, no exception would be signalled.

CASE 2. Overflow Exception not Asserted for Non-flushed Result

This case occurs when the forwarded exponent is the largest exponent which would be considered below the threshold for overflow detection or, when used in final exponent generation causes the initial exponent value for the final result to be the largest exponent which would be considered below the threshold for overflow detection. The lookup process of the bounce logic will not signal overflow for this case. If the mantissa of the forwarded data is all ones and rounding was required of the forwarded result, the lookup process of the bounce detection logic will have incorrectly not detected the exceptional condition. If the same instruction were to read data from the register file after writeback, an exception would be signalled.

CASE 3. Incorrect Assertion of Underflow Exception for Flushed Result

This case occurs in a multiply or multiply-accumulate operation when the multiplier input or the multiplicand input is a forwarded value which is below the threshold for underflow. The value of the forwarded exponent, when added to the exponent of the non-forwarded operand may produce an initial exponent value for the final result which may be interpreted as below the underflow threshold for a multiply and would indicate an underflow exception. If the forwarded value was flushed to zero the lookup process of the bounce logic will have incorrectly detected the exceptional condition. If the same instruction were to read data from the register file after writeback, no exception would be signalled and a zero result would be generated.

The three scenarios discussed above indicate that the bounce detection logic 1020 is data dependent and will behave differently in forward and no-forward cases. To remove this inconsistency, the exception detection logic requires information about the forwarded data. As mentioned earlier, this information includes four exponent masks to identify the critical exponents and an all-ones mantissa signal passed to the bounce detection logic from register 1010. These signals are processed in stage 1 of the control path to detect these boundary cases.

The following are examples of how the bounce detection logic 1020 adjusts the determination made based on the originally supplied exponent values to take account of case 1 above. In the following examples, the instruction that produces the forward data shall be referred to as the source instruction, and the instruction that consumes this data (the dependent instruction following the source) will be referred to as the target instruction.

Non-Cvt Target Instructions:

Unlike-signed-add underflow bounce levels are as follows:

| IP  | SP  | DP  | Description             |
|-----|-----|-----|-------------------------|
| FA0 | 20  | 3A0 | Minimum normal SGL (USA)|
| F9F | 1F  | 39F | Underflow SGL (USA)     |
| C40 |     | 040 | Minimum normal DBL (USA)|
| C3F |     | 03F | Underflow DBL (USA)     |

Many floating point operations can produce an unfinalised result with exponent equal to 0×F9F (for a SP operation) or 0×C3F (for a DP operation), with an all-ones mantissa and a round-increment bit. In these cases, a target USA operation should NOT signal potential underflow. This can be detected by the bounce detection logic determining whether WrFwdEIsUSAMin & WrFwdRndBit & WrFwdMIsAllOnes=1

If so, then an exception should not be generated. In practice the bounce detection logic uses the qualified round signals generated by the, qualifier circuit 1000 rather than the raw WrFwdRndBit signal, but for the sake of simplicity the term WrFwdRndBit will be used in this and the following examples.

Cvt Target Instructions:

A similar scenario to the USA underflow scenario exists for double precision to single precision convert operations.

If the source operation is in double precision, and the forward exponent is equal to 0×F80, and the forward mantissa is all-ones, and the round increment bit is set, a target double precision to single precision convert operation should not trigger potential underflow. This can be detected by the bounce detection logic 1020 determining whether:

WrFwdEIsCvtMin & WrFwdRndBit & WrFwdMIsAllOnes=1

If so, then an exception should not be generated.

The following are examples of how the bounce detection logic adjusts the determination made based on the originally supplied exponent values to take account of case 2 mentioned above.

Non-Cvt Target Instructions:

The overflow ranges for all non-cvt floating point operations is as follows:

| IP  | SP | DP  | Description         |
|-----|----|-----|---------------------|
| 3FD |    | 7FD | Overflow DBL        |
| 3FC |    | 7FC | Maximum normal DBL  |
| 07D | FD | 47D | Overflow SGL        |
| 07C | FC | 47C | Maximum normal SGL  |

Any source operation producing forward data with
    exponent=0×3FC (for a DP operation) or 0×07C (for SP operation), and
    an all-ones mantissa, and
    a round increment bit
will result in an exponent in the potential overflow range. This should be detected for all target instructions that are dyadic (i.e. two operand instructions) or triadic (i.e. three operand instructions). This can be detected by the bounce detection logic 1020 determining whether:

WrFwdEIsMax & WrFwdRndBit & WrFwdMIsAllOnes=1

If so, an exception signal will be issued by the bounce detection logic.

Cvt Target Instructions:

Analogous to the overflow scenario discussed above for dyadic or triadic operations, a similar scenario exists for double-to-single convert operations. This occurs when the source operation is
    in double precision and produces forward data with
    an exponent value=0×07C, and
    an all-ones mantissa, and
    a round increment bit.

This will result in an exponent in the overflow range and should be detected appropriately by the bounce detection logic 1020 determining whether WrFwdEIsCvtMax & WrFwdRndBit & WrFwdMIsAllOnes=1

If so, an exception signal is issued by the bounce detection logic.

Although a particular embodiment of the invention has been described herewith, it will be apparent that the invention is not limited thereto, and that many modifications and additions may be made within the scope of the invention. For example, although the preferred embodiment has been described in relation to a CPU with a physically separate coprocessor, this need not be the case. For example, the floating-point unit may be provided within the main processor.

Further, whilst FIG. 5 gives one example of an exception detection table, it will be appreciated that various exception detection tables may be provided for specific instructions or groups of instructions. In addition, the positioning of logic elements within the control path may differ from that shown in FIGS. 3 and 4 to suit particular implementations. Further, embodiments of the present invention are not restricted to use with the particular instructions described in the above description, and for example could be applied to division instructions, square root instructions, inverse versions of instructions, and partial implementations of instructions. It should also be noted that whilst an unfinalised result may in one embodiment only be forwarded to a single input operand, it could also be forwarded to multiple input operands.

In addition, various combinations of the features of the following dependent claims could be made with the features of the independent claims without departing from the scope of the present invention.

We claim:

1. A data processing apparatus for processing floating point instructions, comprising:
an execution unit comprising a plurality of pipelined stages, and being responsive to a floating point instruction to apply a floating point operation to a number of operands to produce a final result, result data being generated during a predetermined pipelined stage with further processing then being performed on the result data in one or more subsequent pipelined stages to generate the final result;
exception determination logic for determining based on the operands whether an exception may occur during application of the floating point operation to the operands, and to prevent the execution unit applying the floating point operation to those operands if it is determined that an exception may occur;
a forwarding path for forwarding the result data generated in the predetermined pipelined stage during processing of a first floating point instruction to a previous pipelined stage for use as an operand of a second floating point instruction, control logic for generating predetermined control data related to the forwarded result data, the exception determination logic being arranged to use at least some of the predetermined control data to compensate for differences between the forwarded result data and the final result relevant when determining whether an exception may occur when processing the second floating point instruction.

2. A data processing apparatus as claimed in claim 1, wherein the exception determination logic is arranged to make a determination from an initial exponent value for a final result of the second floating point instruction as to whether an exception may occur, and to use at least some of the predetermined control data to determine whether the determination made dependent on the initial exponent value needs altering to compensate for relevant differences between the forwarded result data and the final result.

3. A data processing apparatus as claimed in claim 1, wherein the result data includes a mantissa result value, the control logic is arranged to receive an indication of the mantissa result value, and said predetermined control data generated by the control logic includes a mantissa signal indicating whether the mantissa is all ones.

4. A data processing apparatus as claimed in claim 3, wherein the result data includes an exponent result value, the control logic is arranged to receive an indication of the exponent result value, and said predetermined control data generated by the control logic includes a number of threshold signals indicating whether the exponent result value is at a threshold value.

5. A data processing apparatus as claimed in claim 4, wherein the first threshold signal indicates whether the exponent result value is a largest value which is below the threshold for underflow detection.

6. A data processing apparatus as claimed in claim 4, wherein a second threshold signal indicates whether the exponent result value is a largest allowable value.

7. A data processing apparatus as claimed in claim 1, wherein at least some of the predetermined control data is used to generate signals used within the execution unit when processing the second floating point instruction to alter the forwarded result data to compensate for differences between the forwarded result data and the final result.

8. A data processing apparatus for processing floating point instructions, comprising:

an execution unit comprising a plurality of pipelined stages, and being responsive to a floating point instruction to apply a floating point operation to a number of operands to produce a final result, result data being generated during a predetermined pipelined stage with further processing then being performed on the result data in one or more subsequent pipelined stages to generate a final result;

exception determination logic for determining based on the operands whether an exception may occur during application of the floating point operation to the operands, and to prevent the execution unit applying the floating point operation to those operands if it is determined that an exception may occur;

a forwarding path for forwarding the result data generated in the predetermined pipelined stage during processing of a first floating point instruction to a previous pipelined stage for use as an operand of a second floating point instruction, control logic for generating predetermined control data related to the forwarded result data, the exception determination logic being arranged to use at least some of the predetermined control data to compensate for differences between the forwarded result data and the final result relevant when determining whether an exception may occur when processing the second floating point instruction, wherein the result data includes a mantissa result value, the control logic is arranged to receive an indication of the mantissa result value, and said predetermined control data generated by the control logic includes a mantissa signal indicating whether the mantissa is all ones, wherein the result data includes an exponent result value, the control logic is arranged to receive an indication of the exponent result value, and said predetermined control data generated by the control logic includes a number of threshold signals indicating whether the exponent result value is at a threshold value, wherein a first threshold signal indicates whether the exponent result value is a largest value which is below the threshold for underflow detection, wherein the predetermined control data includes a rounding signal indicating whether the result data was incremented during rounding to produce the final result, the exception determination logic is arranged to determine from an initial exponent value for a final result of the second floating point instruction whether an exception may occur, and the exception detection logic is arranged to be responsive to the mantissa signal, the first threshold signal and the rounding signal, such that if the initial exponent value for the final result of the second floating point instruction is based on the forwarded result data, the exception determination logic is arranged not to generate an underflow exception if the first threshold signal indicates that the exponent result value is the largest value which is below the threshold for underflow detection, the mantissa signal indicates that the mantissa result value is all ones, and the rounding signal indicates that the result data was rounded to produce the final result.

9. A data processing apparatus for processing floating point instructions, comprising:

an execution unit comprising a plurality of pipelined stages, and being responsive to a floating point instruction to apply a floating point operation to a number of operands to produce a final result, result data being generated during a predetermined pipelined stage with further processing then being performed on the result data in one or more subsequent pipelined stages to generate a final result;

exception determination logic for determining based on the operands whether an exception may occur during application of the floating point operation to the operands, and to prevent the execution unit applying the floating point operation to those operands if it is determined that an exception may occur;

a forwarding path for forwarding the result data generated in the predetermined pipelined stage during processing of a first floating point instruction to a previous pipelined stage for use as an operand of a second floating point instruction, control logic for generating predetermined control data related to the forwarded result data, the exception determination logic being arranged to use at least some of the predetermined control data to compensate for differences between the forwarded result data and the final result relevant when determining whether an exception may occur when processing the second floating point instruction, wherein the result data includes a mantissa result value, the control logic is arranged to receive an indication of the mantissa result value, and said predetermined control data generated by the control logic includes a mantissa signal indicating whether the mantissa is all ones, wherein the result data includes an exponent result value, the control logic is arranged to receive an indication of the exponent result value, and said predetermined control data generated by the control logic includes a number of threshold signals indicating whether the exponent result value is at a threshold value, wherein a second threshold signal indicates whether the exponent result value is a largest allowable value, wherein the predetermined control data includes a rounding signal indicating whether the result data was incremented during rounding to produce the final result, the exception determination logic is arranged to determine from an initial exponent value for a final result of the second floating point instruction whether an exception may occur, and the exception detection logic is arranged to be responsive to the mantissa signal, the second threshold signal and the rounding signal, such that if the initial exponent value for the final result of the second floating point instruction is based on the forwarded result data, the exception determination logic is arranged to generate an overflow exception if the second threshold signal indicates that the exponent result value is the largest allowable value, the mantissa signal indicates that the mantissa result value is all ones, and the rounding signal indicates that the result data was rounded to produce the final result.

10. A data processing apparatus for processing floating point instructions, comprising:

an execution unit comprising a plurality of pipelined stages, and being responsive to a floating point instruction to apply a floating point operation to a number of operands to produce a final result, result data being generated during a predetermined pipelined stage with further processing then being performed on the result data in one or more subsequent pipelined stages to generate a final result;

exception determination logic for determining based on the operands whether an exception may occur during application of the floating point operation to the operands, and to prevent the execution unit applying the floating point operation to those operands if it is determined that an exception may occur;

a forwarding path for forwarding the result data generated in the predetermined pipelined stage during processing of a first floating point instruction to a previous pipelined stage for use as an operand of a second floating point instruction, control logic for generating predetermined control data related to the forwarded result data, the exception determination logic being arranged to use at least some of the predetermined control data to compensate for differences between the forwarded result data and the final result relevant when determining whether an exception may occur when processing the second floating point instruction, wherein the exception determination logic is arranged to make a determination from an initial exponent value for a final result of the second floating point instruction as to whether an exception may occur, and to use at least some of the predetermined control data to determine whether the determination made dependent on the initial exponent value needs altering to compensate for relevant differences between the forwarded result data and the final result, wherein the predetermined control data includes a flush signal indicating whether the final result was flushed to a zero value due to the result data being below a predetermined threshold, and if the initial exponent value for the final result of the second floating point instruction is based on the forwarded result data, the exception determination logic is arranged to disregard any underflow exception determined from the initial exponent value for the final result.

11. A data processing apparatus for processing floating point instructions, comprising:

an execution unit comprising a plurality of pipelined stages, and being responsive to a floating point instruction to apply a floating point operation to a number of operands to produce a final result, result data being generated during a predetermined pipelined stage with further processing then being performed on the result data in one or more subsequent pipelined stages to generate a final result;

exception determination logic for determining based on the operands whether an exception may occur during application of the floating point operation to the operands, and to prevent the execution unit applying the floating point operation to those operands if it is determined that an exception may occur;

a forwarding path for forwarding the result data generated in the predetermined pipelined stage during processing of a first floating point instruction to a previous pipelined stage for use as an operand of a second floating point instruction, control logic for generating predetermined control data related to the forwarded result data, the exception determination logic being arranged to use at least some of the predetermined control data to compensate for differences between the forwarded result data and the final result relevant when determining whether an exception may occur when processing the second floating point instruction, wherein at least some of the predetermined control data is used to generate signals used within the execution unit when processing the second floating point instruction to alter the forwarded result data to compensate for differences between the forwarded result data and the final result, wherein the predetermined control data includes a rounding signal indicating whether the result data was incremented during rounding to produce the final result.

12. A data processing apparatus as claimed in claim 11, wherein the execution unit includes an incrementer to increment an operand input thereto, and a multiplexer associated therewith, the multiplexer being arranged to select the output of the incrementer if that operand is based on the forwarded result data and the rounding signal indicates that incrementing during rounding occurred.

13. A data processing apparatus as claimed in claim 11, wherein the forwarded result data is used as the multiplier for the second floating point instruction, and if the rounding signal indicates that incrementing during rounding occurred, a multiplication unit in the execution unit is arranged to incorporate another instance of the multiplicand in the computation of a multiplication result.

14. A data processing apparatus as claimed, in claim 11, wherein the forwarded result data is used as the multiplicand for the second floating point instruction, and if the rounding signal indicates that incrementing during rounding occurred, a multiplication unit in the execution unit is arranged to employ a modified recoding table used within the multiplication unit during the computation of a multiplication result.

15. A data processing apparatus for processing floating point instructions, comprising:

an execution unit comprising a plurality of pipelined stages, and being responsive to a floating point instruction to apply a floating point operation to a number of operands to produce a final result, result data being generated during a predetermined pipelined stage with further processing then being performed on the result data in one or more subsequent pipelined stages to generate a final result;

exception determination logic for determining based on the operands whether an exception may occur during application of the floating point operation to the operands, and to prevent the execution unit applying the floating point operation to those operands if it is determined that an exception may occur;

a forwarding path for forwarding the result data generated in the predetermined pipelined stage during processing of a first floating point instruction to a previous pipelined stage for use as an operand of a second floating point instruction, control logic for generating predetermined control data related to the forwarded result data, the exception determination logic being arranged to use at least some of the predetermined control data to compensate for differences between the forwarded result data and the final result relevant when determining whether an exception may occur when processing the second floating point instruction, wherein at least some of the predetermined control data is used to generate signals used within the execution unit when processing the second floating point instruction to alter the forwarded result data to compensate for differences between the forwarded result data and the final result, wherein the predetermined control data includes a flush signal indicating whether the final result was flushed to a zero value due to the result data being below a predetermined threshold.

16. A data processing apparatus as claimed in claim 15, wherein the execution unit includes a multiplexer having a zero value as one input and one or more other inputs based on one or more operands, the multiplexer being arranged to select the zero value as its output if the one or more operands are based on the forwarded result data and the flush signal indicates that the final result was flushed to zero.

17. A method of operating a data processing apparatus to process floating point instructions, the data processing apparatus comprising an execution unit having a plurality of pipelined stages, and being responsive to a floating point instruction to apply a floating point operation to a number of operands to produce a final result, result data being generated during a predetermined pipelined stage with further processing then being performed on the result data in one or more subsequent pipelined stages to generate the final result, the method comprising the steps of:

(i) determining based on the operands whether an exception may occur during application of the floating point operation to the operands;

(ii) preventing the execution unit applying the floating point operation to those operands if it is determined that an exception may occur;

(iii) forwarding the result data generated in the predetermined pipelined stage during processing of a first floating point instruction to a previous pipelined stage for use as an operand of a second floating point instruction;

(iv) generating predetermined control data related to the forwarded result data, at least some of the predetermined control data being used in said step (i) to compensate for differences between the forwarded result data and the final result relevant when determining whether an exception may occur when processing the second floating point instruction.

* * * * *